United States Patent [19]

Huriau

[11] 4,302,842
[45] Nov. 24, 1981

[54] DIGITAL RADIO REPEATER WITH REGENERATOR

[75] Inventor: Alain Huriau, Paris, France

[73] Assignee: Thomson-CSF, Paris, France

[21] Appl. No.: 88,099

[22] Filed: Oct. 24, 1979

[30] Foreign Application Priority Data

Oct. 31, 1978 [FR] France ............................ 78 30850

[51] Int. Cl.³ ........................ H04B 3/36; H04L 27/22
[52] U.S. Cl. ............................................. 375/3; 375/86
[58] Field of Search ................ 375/3, 4, 9, 86; 455/7, 455/23, 60, 86, 318; 178/117

[56] References Cited

U.S. PATENT DOCUMENTS

| | | | |
|---|---|---|---|
| 3,502,985 | 3/1970 | Hata ......................................... | 375/4 |
| 3,594,651 | 7/1971 | Wolejsza, Jr. ........................... | 375/9 |
| 3,609,550 | 9/1971 | Guyer ..................................... | 375/86 |
| 3,737,578 | 6/1973 | Matsuo ................................... | 375/86 |
| 3,984,777 | 10/1976 | Noguchi ................................. | 375/86 |
| 4,039,961 | 8/1977 | Ishio et al. ............................. | 375/86 |

*Primary Examiner*—Donald J. Yusko
*Attorney, Agent, or Firm*—Roland Plottel

[57] ABSTRACT

The transparency to the operating signals of a digital signal radio link repeater is obtained by using a demodulator with a carrier signal recovery circuit, whose band width is determined in such a way that the regenerated carrier signal is used in the reconstitution of the modulated signal, after regeneration of the digital train, whilst transmitting the original modulation by the operating signals.

4 Claims, 2 Drawing Figures

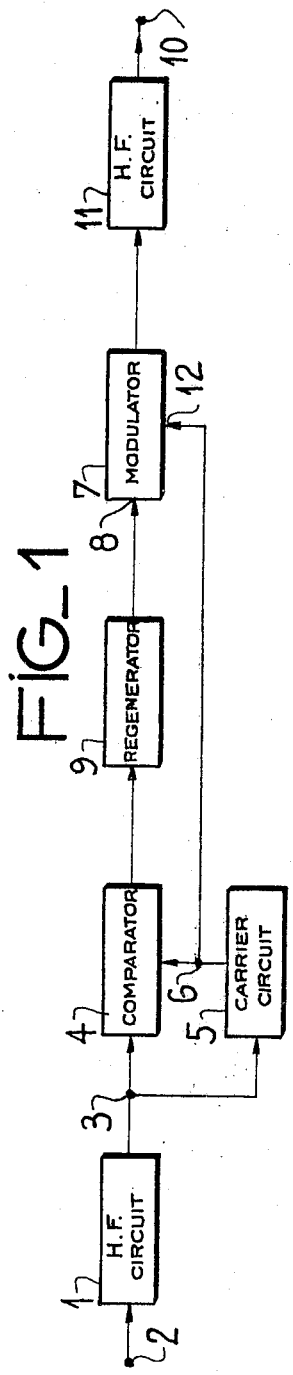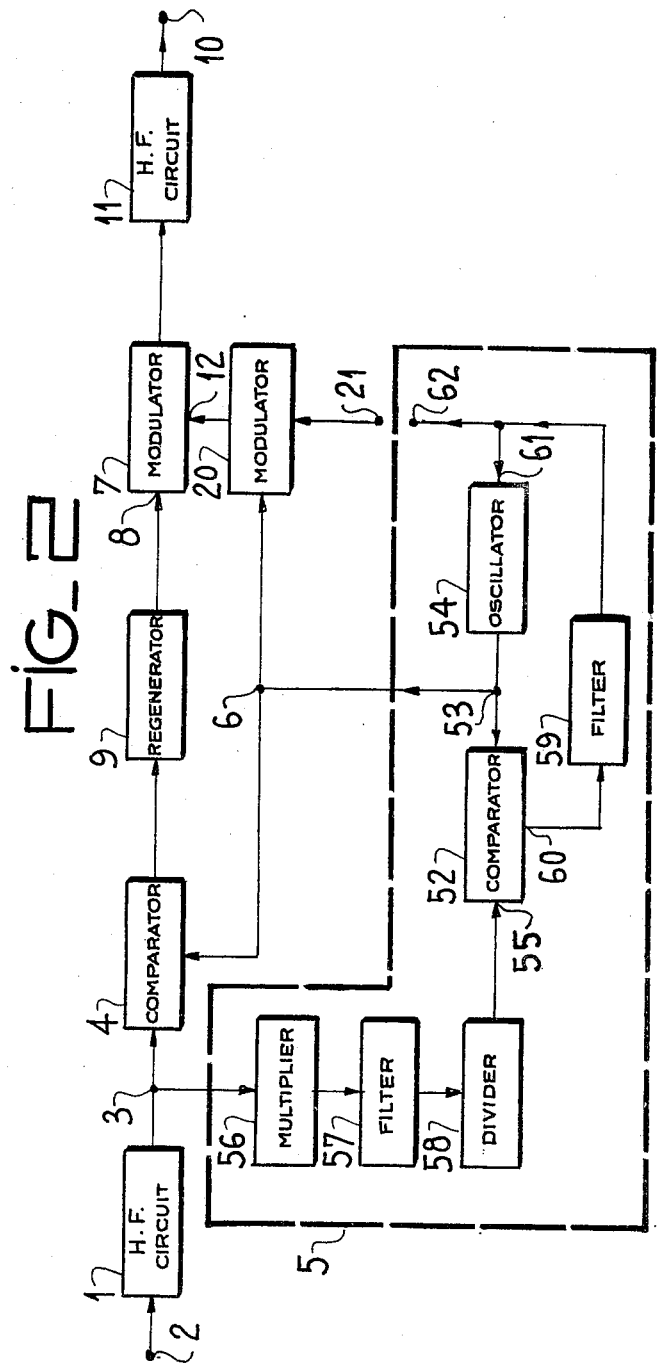

DIGITAL RADIO REPEATER WITH REGENERATOR

BACKGROUND OF THE INVENTION

The present invention relates to digital radio repeaters with regeneration and more specifically to those permitting the formation of links where operating signals are to be transmitted through the repeaters.

It is well known that good quality digital links and particularly long links having numerous repeaters necessitate a regeneration of the binary train transmitted in the latter or at least in some of them and this regeneration is preceded by a demodulation and is followed by an intermediate frequency modulation.

The operating signals received with the information signal to regenerate at each repeater station and, eventually, operating signals locally generated in this station have to be transmitted to the following repeater station. Angle auxiliary modulation of the carrier by the operating signals being suppressed when demodulating the carrier to restitute the information signal, an auxiliary path has to be provided for demodulating the auxiliary modulation and restitute the operating signals. After regeneration of the information signal and remodulation of carrier by this signal, the operating signals remodulate the carrier. This complicates the equipments and reduces their reliability.

BRIEF SUMMARY OF THE INVENTION

The present invention aims at obviating these disadvantages and ensuring the transparency of the repeaters to the operating signals in transit.

According to the invention, a radio repeater transmitting a carrier signal phase-modulated by a digital signal and modulated in angular manner by the operating signals comprises in series a phase demodulator with a carrier recovery circuit, a device for regenerating the digital signal and a phase modulator, the pass band of the carrier recovery circuit being at least equal to the frequency spectrum due to the angle modulation by the operating signals and the recovered carrier signal being applied to the modulator for the phase modulation thereof by the regenerated digital signal.

BRIEF DESCRIPTION OF THE DRAWINGS

The invention is described in greater detail hereinafter relative to non-limitative embodiments and the attached drawings, wherein show:

FIG. 1 a general diagram of a radio repeater according to the invention.

FIG. 2 a preferred embodiment of the repeater of FIG. 1.

DETAILED DESCRIPTION OF THE PREFERRED EMBODIMENTS

FIG. 1 shows an intermediate frequency conversion and amplification circuit 1 which receives at an input terminal 2 the signals collected by a not shown antenna. Its output 3 is connected to a first input of a phase comparison device 4 and to a carrier recovery circuit 5. The output 6 of the latter is connected to a second input of device 4 and to the input of the carrier signal 12 of a phase modulator 7, whose modulation input 8 is connected to the output of device 4 across a regenerator 9. The output of modulator 7 is connected to the output of repeater 10 across a high frequency conversion and amplification circuit 11.

Device 4 and circuit 5 constitute a carrier recovery phase demodulator as is provided on a conventional digital radio link repeater. However, the presently described arrangements differ from the prior art by the use of a carrier recovered on terminal 6 as the carrier signal to be transmitted to modulator 7, which reconstitutes the intermediate frequency (I.F) modulated train from the binary train regenerated in device 9.

Thus, the present arrangement obviates the conventionally provided intermediate frequency signal generator and also ensures the transparency of the repeater for the operating signals transmitted by an auxiliary angle modulation of the signal carrier received.

Thus, assuming that the signal received is phase modulated with eight phase states by the binary information train to be transmitted and also angle modulated by the operating signals, it is sufficient for said auxiliary angle modulation to have a peak index well below $2\pi/8$ radian and for the pass band of circuit 5 to be at least equal to the frequency spectrum due to this angle modulation and well below the digital information train frequency for the demodulation of the latter by device 4 to be correctly ensured and for the carrier signal applied at 12 to modulator 7 to have the original auxiliary angle modulation, which will thus again be transmitted to the repeater output 10.

A preferred embodiment of the invention is shown in FIG. 2. The reference numerals which are the same as those in FIG. 1 relate to identical components and the output 6 of circuit 5 supplies the input of carrier signal 12 across an angle modulator 20 having a modulation input 21 at which are applied locally generated operating signals. In addition, the carrier recovery circuit 5 has a phase comparator 52, whose first input 53 is connected to the output of an oscillator 54 and to the output terminal 6 of circuit 5 and whose second input 55 is connected to the input of circuit 5 in the signal travel direction across a multiplier 56, a band pass filter 57 and a divider 58 which are mounted in series. It also has a low pass filter 59 inserted between output 60 of comparator 52 and the frequency control input 61 of oscillator 54, whereby said input 61 is also connected to the output terminal 62.

The signals apply to input 2 and are assumed to be a carrier signal modulated in phase with four states by a digital train and by operating signals whose highest transmitted frequency is 52 kHz, the peak modulation index being $\pm\pi/12$ radian. Device 4 and circuit 5 here constitute a coherent demodulator with four phase states. Multiplier 56 and divider 58 have the same coefficient equal to 4 and filter 57 has a pass band of approximately 140 kHz corresponding to the Carson band of the auxiliary modulation.

Thus, the signal received at input 55 of comparator 52 no longer has the main quadriphase modulation, because the phase jumps are all converted into phase variations equal to multiples of 360°. However, the analog modulation by the operating signals is wholly transmitted and is therefore communicated to the output signal of intermediate frequency generator 54 by the action of the feedback loop, whose filter 59 transmits the complete spectrum of frequencies of the operating signals received. The latter are collected for local processing on the output terminal 62. The local transmission of these signals is ensured by phase angle modulator 20 across its modulation input 21, the level applied being adjusted so that it does not exceed the overall peak modulation index of $\pi/12$ radian. As a variant, this transmission could also be ensured by a phase modulation of the local oscillator of the converter included in circuits 11 for transposing the intermediate frequency signal to the final transmission frequency.

It is pointed out that the arrangements described have the advantage of rendering superfluous a demodulator for the operating signals associated with a connector of the reinjected local signals, as well as an intermediate frequency signal generator, whilst ensuring the transmission of the operating signals in the case of a breakdown of the digital train regeneration device. This significantly reduces the cost price and increases the reliability compared with known digital repeaters.

The invention is not limited to the embodiments described and represented hereinbefore and various modifications can be made thereto without passing beyond the scope of the invention.

What is claimed is:

1. A radio repeater transmitting a carrier signal modulated in phase, with n phase states, by a digital signal and in angle by operating signals and comprising in series a phase demodulator, a digital signal regenerating device and a phase modulator with n phase states having a modulation input and a carrier signal input, the phase demodulator being a coherent demodulator comprising a phase comparator having a first input receiving the modulated carrier signal and a second input, a carrier recovery circuit having an input and an output respectively connected to the first and second inputs of the comparator, the pass band of the carrier regenerating circuit being at least equal to the frequency spectrum due to the angle modulation by the operating signals, and the recovery circuit output also being connected to the carrier signal input of the phase modulator.

2. A radio repeater according to claim 1 wherein the recovery circuit comprises a second phase comparator with a first input coupled to the input of the circuit, a second input and an output and a frequency-controlled oscillator having a control input connected to the output of the second comparator across a low pass filter having a frequency band equal to the frequency band of the operating signals and an output connected to the second input of the second comparator which is also the output of the recovery circuit, the output of said filter supplying said operating signals modulating the carrier signal received by the repeater.

3. A radio repeater according to claim 2, wherein the input of the recovery circuit is connected to the first input of the second phase comparator across a filtering device comprising in series a multiplier by n, a band filter and a divider by n, the width of the band of the band filter being substantially equal to the Carson band of the angle modulation of the carrier signal by the operating signals.

4. A radio repeater according to claim 2, wherein n is equal to 4, the angle modulation being a phase modulation whose peak deviation is substantially below $\pi/2$.

* * * * *